United States Patent
Legrand et al.

(10) Patent No.: US 10,515,426 B2
(45) Date of Patent: Dec. 24, 2019

(54) METHOD FOR ESTIMATING A CHARACTERISTIC OF A LIQUEFIED NATURAL GAS LOAD

(71) Applicant: GDF SUEZ, Courbevoie (FR)

(72) Inventors: Frederic Legrand, Paris (FR); Benoit Portannier, Paris (FR); Yacine Zellouf, Asnieres sur Seine (FR); Laurent Benoit, Paris (FR)

(73) Assignee: Engie, Courbevoie (FR)

( * ) Notice: Subject to any disclaimer, the term of this patent is extended or adjusted under 35 U.S.C. 154(b) by 357 days.

(21) Appl. No.: 15/108,288

(22) PCT Filed: Nov. 25, 2014

(86) PCT No.: PCT/FR2014/053034
§ 371 (c)(1),
(2) Date: Jun. 24, 2016

(87) PCT Pub. No.: WO2015/079162
PCT Pub. Date: Jun. 4, 2015

(65) Prior Publication Data
US 2016/0343092 A1    Nov. 24, 2016

(30) Foreign Application Priority Data
Nov. 26, 2013  (FR) ..................... 13 61652

(51) Int. Cl.
*G06Q 10/08* (2012.01)
*G06Q 10/06* (2012.01)
*G06Q 50/06* (2012.01)

(52) U.S. Cl.
CPC ......... *G06Q 50/06* (2013.01); *G06Q 10/0831* (2013.01); *G06Q 10/0832* (2013.01)

(58) Field of Classification Search
CPC . G06Q 50/06; G06Q 10/0831; G06Q 10/0832
See application file for complete search history.

(56) References Cited

U.S. PATENT DOCUMENTS 6,298,671 B1 * 10/2001 Kennelley ............... F17C 1/002
62/50.2
2010/0088142 A1 * 4/2010 El-Bakry ......... G06Q 10/06312
705/7.22

(Continued)

FOREIGN PATENT DOCUMENTS

CN      102341303 A     2/2012
JP      2005-280973 A   10/2005
(Continued)

OTHER PUBLICATIONS

Miana, M., Hoyo, R. D., Rodrigálvarez, V., Valdés, J. R. and Llorens, R. Calculation models for prediction of Liquefied Natural Gas (LNG) ageing during ship transportation, Jun. 24, 2009.*

(Continued)

*Primary Examiner* — Daniel Vetter
*Assistant Examiner* — Manal A. Alsamiri

(57) ABSTRACT

A method of estimating a characteristic ($Q_n'$, $Q_1'$) of a load of liquefied natural gas being transported by a tanker at any point on a route (401, P; 501, 502, 503), the method being characterized in that the estimation is made by integrating, over the route (410, 411, 412, 420; 510, 511, 512) from a reference point (400, P; 500) at which said characteristic is known ($Qn$, $Ql$), a relationship associating the instantaneous transformation of the load with instantaneous navigation conditions.

23 Claims, 3 Drawing Sheets

(56) References Cited

U.S. PATENT DOCUMENTS

| | | | | |
|---|---|---|---|---|
| 2010/0287073 | A1* | 11/2010 | Kocis | G06Q 10/047 705/28 |
| 2014/0310049 | A1* | 10/2014 | Goel | G06Q 10/04 705/7.24 |
| 2014/0316839 | A1* | 10/2014 | Furman | G06Q 10/06 705/7.24 |

FOREIGN PATENT DOCUMENTS

| | | | |
|---|---|---|---|
| JP | 2006260155 A | | 9/2006 |
| JP | 2013104690 A | * | 5/2013 |
| WO | WO 2010/059307 A1 | | 5/2010 |
| WO | 2013085692 A1 | | 6/2013 |

OTHER PUBLICATIONS

Engas, The Gloal Energy Challange: reviewing the stratgies for Natural Gas. 24th World Gas Conferance ( Argintina, Oct. 5-9, 2009), New approaches in LNG Quality & Energy determination during LNG carrier unloading.*

Dobrota,DĐ., Lalić, B. and Komar, I. (2013). Problem of Boil—off in LNG Supply ( retrieved Jul. 6, 2019) (Year: 2013).*

Głomski, and Michalski. "Problems with Determination of Evaporation Rate and Properties of Boil-off Gas on Board LNG Carriers." Journal of Polish CIMAC, yadda.icm.edu.pl/baztech/element/bwmeta1.element.baztech-article-BPG8-0055-0035. (Year: 2011).*

Dobrota,Đ., Lalić, B. and Komar, I. (2013). Problem of Boil—off in LNG Supply ( retrieved Jul. 6, 2019) (Year: 2013).*

Rozenblat, Anatoly I. Statistical Analysis in Transporting LNG by Sea. AuthorHouse, 2010. (Year: 2010).*

Miana, M., Hoyo, R. D., Rodrigalvárez, V., Valdés, J. R. and Llorens, R. Calculation models for prediction of Liquefied Natural Gas (LNG) ageing during ship transportation, Jun. 24, 2009. (Year: 2009).*

Engas, The Gloal Energy Challange: reviewing the stratgies for Natural Gas. 24th World Gas Conferance ( Argintina, Oct. 5-9, 2009), New approaches in LNG Quality & Energy determination during LNG carrier unloading. (Year: 2009).*

Hasan, M. M., Zheng, A. M., & Karimi, I. A. (2009). Minimizing Boil-Off Losses in Liquefied Natural Gas Transportation. Industrial & Engineering Chemistry Research,48(21), 9571-9580. doi:10.1021/ie801975q (Year: 2009).*

Search Report and Written Opinion in connection with Singapore Patent Application No. 11201605228Y dated Jul. 20, 2017, 8 pages.

Pawel Glomski et al., "Problems with Determination of Evaporation Rate and Properties of Boil-Off Gas on Board LNG carriers", Journal of Polish CIMAC, Jan. 1, 2011, vol. 6, No. 1, 8 pages.

Mario Miana et al., "Calculation Models for Prediction of Liquefied Natural Gas (LNG) Ageing During Ship Transportation", Applied Energy, Dec. 2009, vol. 87, No. 5, 37 pages.

International Search Report dated Feb. 27, 2015 in connection with International Patent Application No. PCT/FR2014/053034, 9 pages.

Written Opinion of the International Searching Authority dated Feb. 27, 2015 in connection with International Patent Application No. PCT/FR2014/053034, 6 pages.

China National Intellectual Property Administration, First Office Action dated Dec. 29, 2018 regarding Chinese Patent Application No. 201480073959.6, 23 pages.

China National Intellectual Property Administration, Translation of First Office Action dated Dec. 29, 2018 regarding Chinese Patent Application No. 201480073959.6, 14 pages.

European Patent Office, "Communication pursuant to Article 94(3) EPC," Application No. EP14814952.9, dated Feb. 4, 2019, 14 pages.

* cited by examiner

METHOD FOR ESTIMATING A CHARACTERISTIC OF A LIQUEFIED NATURAL GAS LOAD

CROSS-REFERENCE TO RELATED APPLICATIONS AND PRIORITY CLAIM

This application claims priority under 35 U.S.C. § 365 to International Patent Application No. PCT/FR2014/053034 filed on Nov. 25, 2014, which claims priority to French Patent Application No. 1361652 filed on Nov. 26, 2013. Both of these applications are hereby incorporated by reference in their entirety.

TECHNICAL CONTEXT

The invention lies in the field of transporting a load that might suffer a transformation during transport depending on the conditions that are encountered during that transport, which transformation may affect the sale price of the load.

A particular application of the invention lies in transporting liquefied gas, generally liquefied natural gas (LNG), by sea. The ships used are methane tankers having tanks for liquefied gas. During transport, a portion of the liquefied gas returns to the gaseous state, with this gas fraction being referred to as boil off gas (BOG). This fraction depends on numerous parameters and factors, including the shape of the tanks and how they are installed, and also the amount of sloshing therein, which depends on the state of the sea during the passage, and on the speed of the tanker. Finally, the BOG fraction that is produced also depends on the duration of the voyage. Certain methane tankers are provided with devices for re-liquefying BOG. Others use it as fuel for propelling the tanker. It is also common practice to burn off BOG, in full or in part, in order to dispose of it in an oxidation process.

The transformation of a portion of the LNG into BOG has an impact not only on the quantity of the LNG that remains, but it also has an impact on the exact composition of the LNG, since certain molecules evaporate more quickly than others. In turn, the composition of the LNG has an influence on its economic advantage (or its quality as seen by potential purchasers of the load) and thus on its price relative to the volume sold.

Companies operating methane tankers need to satisfy calls for tenders that are demanding, based on the market price at a given date, and including constraints on the quality of the product as delivered. These calls for tenders are commonly referred to in the business as "spot" contracts.

At present, for a company operating a methane tanker, satisfying such calls for tenders involves taking a certain amount of risk, since it is difficult to anticipate the quality and the quantity of LNG that will finally be delivered. Transport conditions can be anticipated at least in part, depending on expected weather conditions, and on the speed at which it is intended to cause the tanker to travel. However, at present, it is not possible to make use of this information for determining the quality and the quantity of LNG to be expected at the end of the voyage. Specifically, even though certain operators have access to software (CARGO software developed by the CRIGEN laboratory) for calculating the quantity and the quality of LNG at the end of an intended voyage on the basis of the quality and the quantity of LNG at the beginning of the voyage, that software performs its calculation on the assumption that the gas evaporates at a constant rate during the passage.

This leads to an unsatisfied need in terms of ability to evaluate economic feasibility and to select the appropriate sea route (itinerary, speed), for a methane tanker operator seeking to respond to a spot call for tenders.

Correspondingly, there also exists an unsatisfied need for an effective solution for improving the estimated quality and/or quantity of LNG being transported by a tanker at all points along its voyage.

DEFINITION OF THE INVENTION AND THE ASSOCIATED ADVANTAGES

In order to solve this problem, there is provided a method of estimating a characteristic of a load of liquefied natural gas being transported by a tanker at any point on a route, characterized in that the estimation is made by integrating, over the route from a reference point at which said characteristic is known, a relationship associating the instantaneous transformation of the load with instantaneous navigation conditions.

The method of estimating a characteristic of a load of liquefied natural gas being transported by a tanker is a method of providing assistance in operating the tanker with the help of this estimate.

Advantageously, the estimation step improves the evaluation of the physical characteristics of the liquefied natural gas being transported by the tanker by taking account of the real dynamics of the evaporation of the gas.

By means of these principles, it is possible to obtain an accurate evaluation of the quality (composition) and of the quantity of liquefied gas being transported, thus making it possible to manage the operation of the tanker better. In particular it is possible to respond very quickly to spot calls for tenders, by obtaining a very accurate evaluation of the profitability of the operation, and while optimizing transport conditions from an economic point of view.

In an implementation, the point of the route for which the estimation is made is the point where the tanker reaches its delivery terminal, or alternatively a point along the route where it is necessary to select between two itineraries. Thus, it can clearly be seen that the method is very flexible in use, being applicable to tankers regardless of whether they have their own sensors for obtaining in real time the composition of the LNG being transported and the characteristics of the BOG that is being produced.

In variants, the route comprises an intended route and the relationship is used on the basis of predicted values for instantaneous navigation conditions. Alternatively, the route comprises a route that has been followed, and the relationship is used on the basis of values recorded on that route for the instantaneous navigation conditions.

For example, the instantaneous navigation conditions comprise the speed of the tanker and weather conditions (the state of the sea and the state of the atmosphere along the route). Provision is also made for the reference point to be the loading terminal of the tanker.

The speed of the tanker and the weather conditions are physical magnitudes.

Depending on the implementation, the characteristic of the transported gas may comprise the composition of the liquefied gas, the temperature of the liquefied gas, the proportion or quantity of gas that has evaporated since loading, a quality of the liquefied gas, or a quantity of liquefied gas that remains. The relationship supplies the quantity and the composition (quality) of the gas that has evaporated. In a complete implementation, the relationship takes account of the characteristics of the tanks of the methane tanker.

In a particular implementation, estimates are made for a plurality of possible destinations and a comparison is made between those iterations of the market values of the transported gas as calculated for the respective possible destinations, in order to select the destination that is the most lucrative for the load.

The invention also provides a device for estimating a characteristic of a load of liquefied natural gas being transported by a tanker, which device has characterization means for characterizing the state of the gas being transported by a tanker as a function of the route of the tanker, the device being characterized in that the characterization means make use of a relationship associating the instantaneous evaporation of the liquefied gas with instantaneous navigation conditions.

The invention thus provides a device for providing assistance in operating a tanker, which device makes it possible to estimate the characteristic of a liquefied natural gas load being transported by a tanker and includes the characterization means.

LIST OF FIGURES

DETAILED DESCRIPTION

Figure 1:
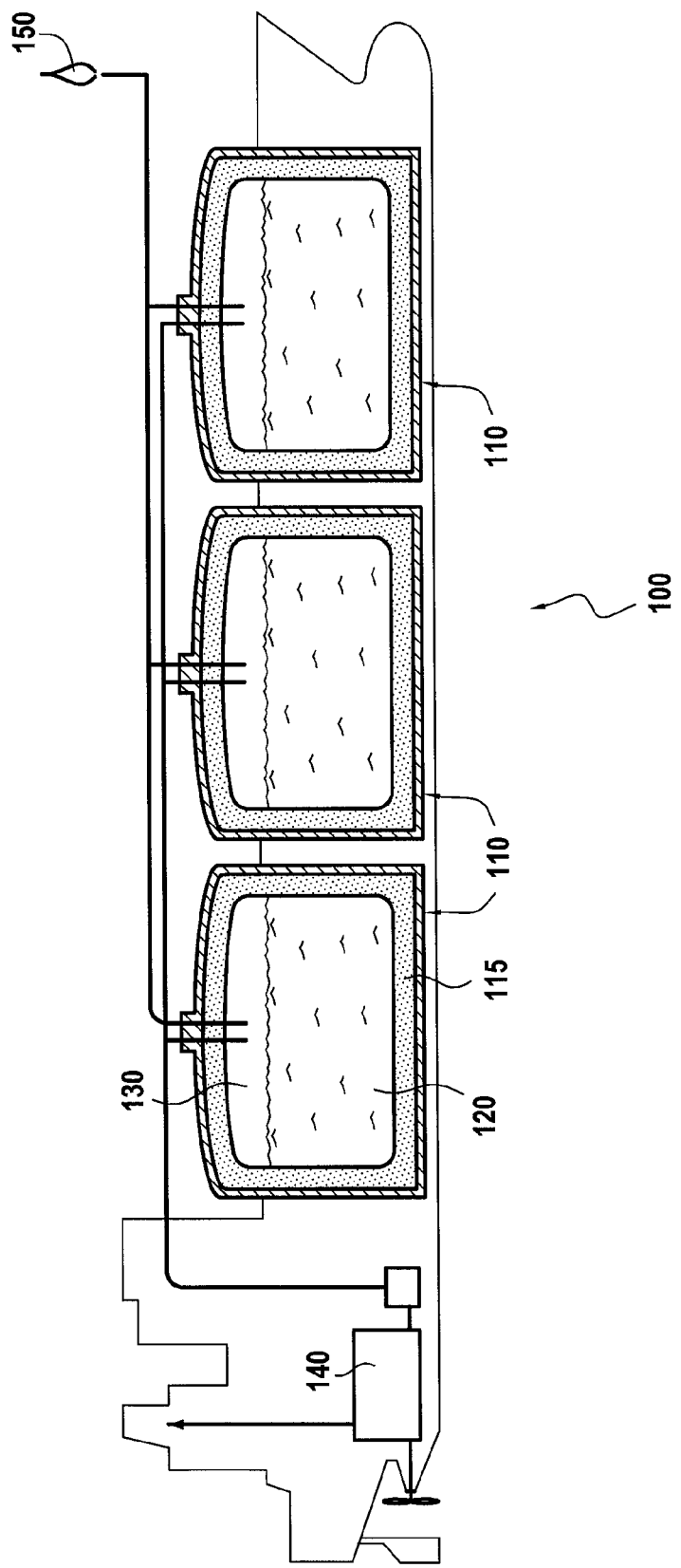
FIG. 1 shows a methane tanker and its cargo.

With reference to FIG. 1, there can be seen a methane tanker 100, having a plurality of tanks 110 filled with LNG 120. In spite of the presence of insulation 115, a portion of the LNG evaporates so as to form BOG 130, throughout the journey of the tanker. The BOG 130 can be used as fuel for propelling the tanker 100 via an engine 140, or it may merely be burnt off via a flare 150.

Figure 2:
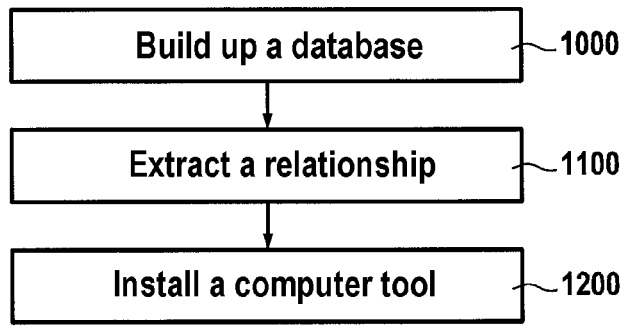
FIG. 2 shows a diagram of the steps performed in an implementation of the invention.

FIG. 2 shows the process performed in an implementation of the invention.

Firstly, an experience database is built up during a stage 1000. This stage may make use of a fleet of tankers, or of a single tanker. Each tanker is fitted with various sensors and recorders for measuring the quantity and the nature of the various components of the BOG during a voyage of the tanker. The sensors may include chromatographs or calorific value analyzers making use of combustion in order to determine the composition of the evaporated gas. The sensors also include tools for measuring the rate of evaporation, e.g. measuring the intake rates of BOG compressors at all times. The sensors may also include tools for measuring the state of the sea, such as an inertial unit, measuring the height of waves or their period, together with the direction of waves and the speed of the tanker. A laser system may be used for measuring the height of waves. Satellite data may also be used, on the basis of GPS coordinates. The sensors may also measure the temperature of the sea or the wind.

The various sensors and recorders are to be found on a single tanker and they take measurements at each instant (typically once every minute, but other frequencies could be used).

This serves to build up an experience database, e.g. by collecting all of the values from one tanker over a year, or from a fleet of tankers over a shorter length of time.

Once the database has been built up during step 1000, a relationship is extracted during a step 1100 for associating conditions at sea with the transformation of LNG into BOG. This involves using a statistical correlation approach, e.g. a polynomial correlation, to associate the quantity and the composition of the remaining LNG and of the BOG with the parameters constituted by the state of the sea (wave height and frequency, speed of currents, temperature of the sea), the characteristics of the tanker (in particular its storage capacity and its insulation system), its speed of advance, weather conditions (including windspeed and outside temperature), and the nature of the LNG initially taken on board.

Once the relationship has been extracted, it is proposed to put it into place in a computer tool, during a step 1200.

By way of example, the computer tool enables the crew of a methane tanker at sea to track the variation in the nature of the liquefied natural gas in its tanks in real time, throughout the voyage.

The tool makes it possible to know the physical characteristics of the liquefied natural gas at the end of the voyage.

The tool also enables the operator, prior to sending the tanker on a given voyage, to optimize the voyage so as to make it profitable. Thus, profitability calculation takes account of the expected navigation conditions, of the expected price on delivering the load to the destination port, as a function of the price on offer in that port and of the expected state of the cargo on arrival, and also of transportation costs, including chartering costs and crew costs. It is verified that constraints on the duration of the voyage and on safety specific to seafaring are satisfied.

The tool also makes it possible to evaluate the possibilities of using a given tanker for responding to a spot call for tenders. Thus, once an optimized route has been determined, it is decided whether the route is profitable in the context of the economics of operating the tanker, or whether it is preferable to keep the tanker available for some other call for tenders.

Figure 3:
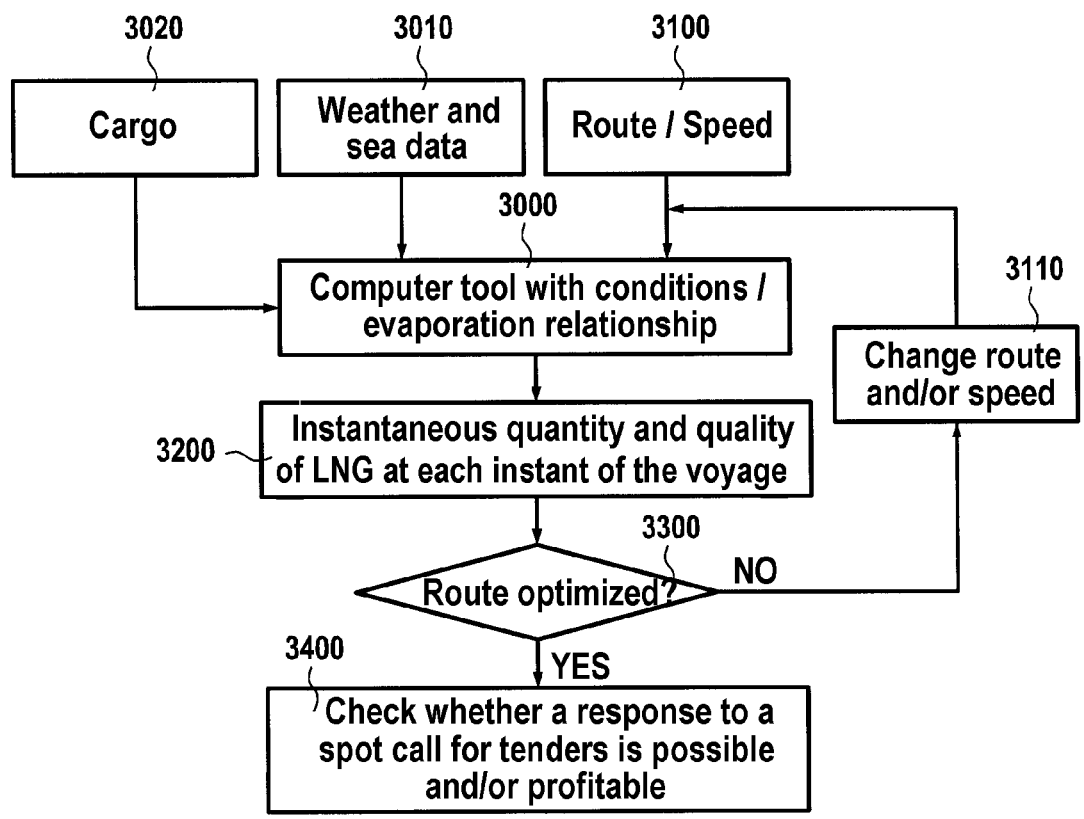
FIG. 3 shows the operation of a tool in an implementation of the invention.

FIG. 3 shows this process in greater detail.

As input, the computer tool 3000 receives data 3010 relating to the forecast weather situation and to the state of the sea. It also receives information 3020 relating to the cargo of the tanker. Initial data 3100 relating to an intended route and an intended speed of navigation on that route (which may be constant or variable along the route) is also supplied to the tool 3000.

On the basis of this data, the tool 3000 supplies the instantaneous quality (or composition) and quantity of LNG at each instant on the voyage, and/or, by taking the difference, the quantity and the composition of the BOG as produced at each instant on the voyage. This data is referenced 3200. By using a convergence criterion, the method makes it possible to decide whether it is desirable to search for route data and speed data that might improve the data 3200. A test is performed in a step 3300. If it is desirable to modify the route or the speed, modified route and speed data 3110 is input once more into the tool 3000, which performs a new calculation, other things remaining equal. If it is estimated that the resulting route is sufficiently well optimized, then there follows a step of investigating whether responding to a spot call for tenders is possible or profitable, which step is referenced 3400.

Figure 4:
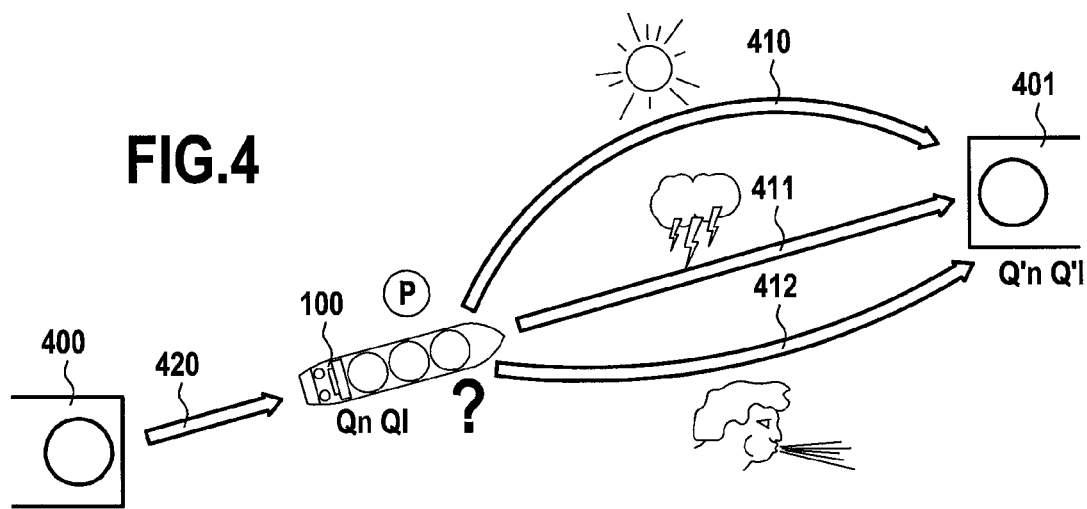
FIGS. 4 and 5 show two implementations of the invention.

An application of the invention is described with reference to FIG. 4.

A methane tanker 100 that has already sailed from a loading port 400 is at present at sea at a point P. In order to reach a port 401, its crew evaluates three sea routes 410, 411, and 412. These routes differ in the expected weather conditions, in authorized speeds, and in authorized distances. Using the above-described tool, the crew can select the route that enables it to reach the port 401, while conserving the best quality $Q_l$ and/or the greatest quantity $Q_n$ of LNG in its tanks. It is specified that in FIG. 4, the notation $Q_n$ and $Q_l$ designates the values at the beginning of the route under analysis, and the notation $Q_n'$ and $Q_l'$ designates the values at the end of the route under analysis. The computer tool is used to integrate the relationship associating transport conditions with transformation of the gas over the three potential routes 410, 411, and 412, while using the forecast or anticipated navigation data.

It is also specified that, if the values $Q_n$ and $Q_l$ are not known at the point P, e.g. because the tanker does not have sensors for measuring them, it is possible to use the proposed computer tool to estimate them by integrating the relationship associating transport conditions with transformation of gas over the route that has already been travelled, referenced 420, while using the actual transport conditions as stored during the crossing between the point 400 and the point P.

Figure 5:
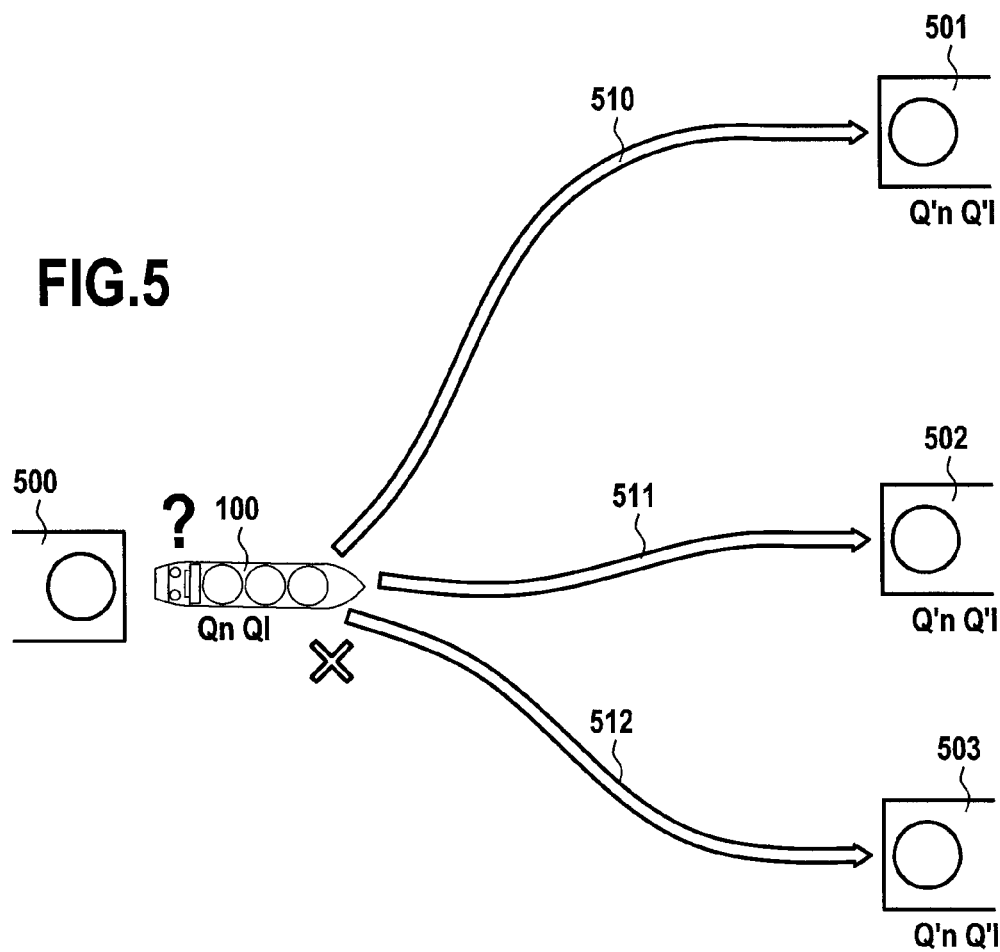

Another application of the invention is described with reference to FIG. 5.

A methane tanker 100 is at a loading port 500. It has been loaded, or it is ready to be loaded with a cargo of LNG. The tanker operator is wondering which destination to give to the tanker and its cargo. Ports 501, 502, and 503 are all potential purchasers of the cargo, each at a different price, with the final price in a given port also depending on the quality and on the quantity of LNG that actually reaches it. The above-mentioned computer tool is used to integrate the relationship associating transport conditions with transformation of the gas over the three potential routes 510, 511, and 512, while using forecast or anticipated navigation data. Using the computer tool, the tanker operator can thus decide to send the tanker to any one of the ports 501, 502, or 503, or indeed to keep the tanker 100 in dock while waiting for other offers to appear, if the offers from the ports 501, 502, and 503 are not sufficiently attractive, given navigation conditions.

The invention is not limited to the implementations described, but extends to any variant coming within the ambit of the scope of the claims.

The invention claimed is:

1. A method of routing a gas tanker comprising:
defining a plurality of pre-selected sea routes;
receiving, at a computer tool, instantaneous navigation conditions associated with the gas tanker, wherein the instantaneous navigation conditions comprise a state of the sea, a speed of advance of the gas tanker, and a state of the atmosphere;
for each pre-selected sea route, estimating, by the computer tool, a composition and a quantity of a load of liquefied natural gas being transported by the gas tanker at an estimation point on the sea route, wherein the estimating comprises:
determining, over the sea route from a reference point at which the composition and the quantity are known to the estimation point, a relationship associating an instantaneous transformation of the composition and quantity of the load of liquefied natural gas with the instantaneous navigation conditions, wherein the instantaneous transformation of the composition and quantity of the load of liquefied natural gas is caused by evaporation and formation of boil-off gas; and
selecting a tanker route from the plurality of pre-selected sea routes that provides at least one of a best estimated composition or a greatest estimated quantity of the load of liquefied natural gas at the estimation point;
wherein the relationship associating the instantaneous transformation of the composition and quantity of the load of liquefied natural gas with the instantaneous navigation conditions is extracted from an experience database to associate the quantity and composition of a remaining load of liquefied natural gas to the instantaneous navigation conditions.

2. The method according to claim 1, wherein the estimation point on the sea route is a point where the gas tanker reaches its delivery terminal or a point along the sea route where it is necessary to select between two itineraries.

3. The method according to claim 1, wherein the sea routes comprise an intended route and the relationship is used on a basis of predicted values for the instantaneous navigation conditions.

4. The method according to claim 1, wherein the reference point is a loading terminal of the gas tanker.

5. The method according to claim 1, further comprising estimating at least one of: a temperature of the load of liquefied natural gas or a proportion or quantity of the load of liquefied natural gas that has evaporated since loading.

6. The method according to claim 1, wherein the relationship supplies a quantity and a composition of the load of liquefied natural gas that has evaporated.

7. The method according to claim 1, wherein the relationship takes into account a storage capacity and an insulation system of the gas tanker.

8. The method according to claim 1, wherein estimation points of the pre-selected sea routes comprise a plurality of possible destinations.

9. The method according to claim 8, wherein the best estimated composition is determined according to market values of the load of liquefied natural gas for the respective possible destinations in order to select the destination that is most lucrative for the load.

10. The method according to claim 1, wherein the reference point is a current position of the gas tanker.

11. The method according to claim 1, wherein:
the estimation point of the plurality of pre-selected sea routes is a port; and
the pre-selected sea routes correspond to at least one of: different distances, different speeds of advances, or different weather conditions.

12. The method according to claim 1, wherein:
each pre-selected sea route comprises an itinerary and a speed of advance along the itinerary; and
selecting the tanker route comprises selecting the itinerary and the speed of advance along the itinerary for one of the pre-selected sea routes.

13. The method according to claim 12, wherein the speed of advance is variable along the itinerary.

14. The method according to claim 1, wherein:
the experience database is built by collecting measured values during one or more voyages of a tanker or a fleet of tankers at successive instants of the one or more voyages; and
the measured values correspond to measurements of the composition and quantity of evaporated gas and to measurements of corresponding instantaneous navigation conditions.

15. A computer-implemented device for routing a gas tanker comprising:
a computer tool configured to:
receive a plurality of pre-selected sea routes;
receive instantaneous navigation conditions associated with the gas tanker, wherein the instantaneous navigation conditions comprise a state of the sea, a speed of advance of the gas tanker, and a state of the atmosphere;
for each pre-selected sea route, estimate a composition and a quantity of a load of liquefied natural gas being transported by the gas tanker at an estimation point on the sea route; and
select a tanker route from the plurality of pre-selected sea routes that provides at least one of a best estimated composition or a greatest estimated quantity of the load of liquefied natural gas;
wherein, to estimate the composition and the quantity of the load of liquefied natural gas for each pre-selected sea route, the computer tool is configured to:
determine, over the sea route from a reference point at which the composition and the quantity are known to the estimation point, a relationship associating an instantaneous transformation of the composition and quantity of the load of liquefied natural gas with the instantaneous navigation conditions, wherein the instantaneous transformation of the composition and quantity of the load of liquefied natural gas is caused by evaporation and formation of boil-off gas; and
wherein the relationship associating the instantaneous transformation of the composition and quantity of the load of liquefied natural gas with the instantaneous navigation conditions is extracted from an experience database to associate the quantity and composition of a remaining load of liquefied natural gas to the instantaneous navigation conditions.

16. The computer-implemented device according to claim 15, further comprising:
the experience database configured to store information used to determine the relationship associating the instantaneous transformation of the composition and quantity of the load of liquefied natural gas with the instantaneous navigation conditions.

17. The computer-implemented device according to claim 15, wherein the computer tool is further configured to estimate at least one of: a temperature of the load of liquefied natural gas or a proportion or quantity of the load of liquefied natural gas that has evaporated since loading.

18. The computer-implemented device according to claim 15, wherein the computer tool is configured to determine the best estimated composition according to market values of the load of liquefied natural gas for the respective possible destinations in order to select the destination that is most lucrative for the load.

19. The computer-implemented device according to claim 15, wherein:
the estimation point of the plurality of pre-selected sea routes is a port; and
the pre-selected sea routes correspond to at least one of: different distances, different speeds of advances, or different weather conditions.

20. The method according to claim 1, wherein:
the state of the sea includes wave height, wave frequency, speed of currents, and temperature of the sea; and
the state of the atmosphere includes windspeed and outside temperature.

21. The method according to claim 1, further comprising:
updating or altering an actual route followed by the gas tanker based on the selected tanker route.

22. The method according to claim 1, further comprising:
recording, using the computer tool, the instantaneous navigation conditions during transport of the load of liquefied natural gas;
wherein the relationship is based on the recorded instantaneous navigation conditions.

23. The method according to claim 1, wherein the computer tool receives the instantaneous navigation conditions from one or more sensors associated with the gas tanker.

* * * * *